March 11, 1952    W. C. TROY ET AL    2,588,998
THERMOCOUPLE
Filed June 16, 1950

INVENTORS
Walter C. Troy and
Gary Steven.
BY
Frederick Shapoe
ATTORNEY

Patented Mar. 11, 1952

2,588,998

UNITED STATES PATENT OFFICE 2,588,998

THERMOCOUPLE

Walter C. Troy, Evergreen Park, and Gary Steven, Oak Lawn, Ill.

Application June 16, 1950, Serial No. 168,422

3 Claims. (Cl. 136—5)

This invention relates to thermocouples, and more particularly to thermocouples suitable for use at extremely high temperatures.

Desirable features in thermocouples employed to explore temperatures are the following:
1. High electromotive force for the temperature range to which the couple is subjected.
2. Chemical and physical stability in the medium or atmosphere under measurement.
3. Linearity in the relationship between temperature and electromotive force, and
4. Reproducibility of the electromotive force for any given temperature difference from thermocouple to thermocouple of the same combination.

Other factors that need be considered from a practical standpoint are reasonable cost thereof, this may be a factor for some unusual applications and ease of preparation of the thermocouple.

While numerous thermocouples are available for determination of tempeartures of up to 1400° C., only a few thermocouples are suitable for exploring temperature ranges of up to 2000° C. The few thermocouples that have been known heretofore for use in the range of from 1400° C. to 1800° C. are deficient in one or more of the requirements above set forth.

The object of this invention is to provide a thermocouple comprising one element of substantially pure tungsten and the other element composed of substantially pure iridium, the thermocouple meeting all of the necessary requirements for a good thermocouple.

A further object of the invention is to provide a thermocouple of pure tungsten and pure iridium suitable for use at temperatures of up to about 2100° C. and requiring no cold junction compensation.

Other objects of the invention will in part be obvious and will in part appear hereinafter.

Figure 1:
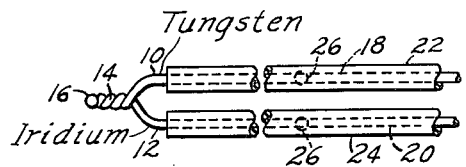
Figure 2:
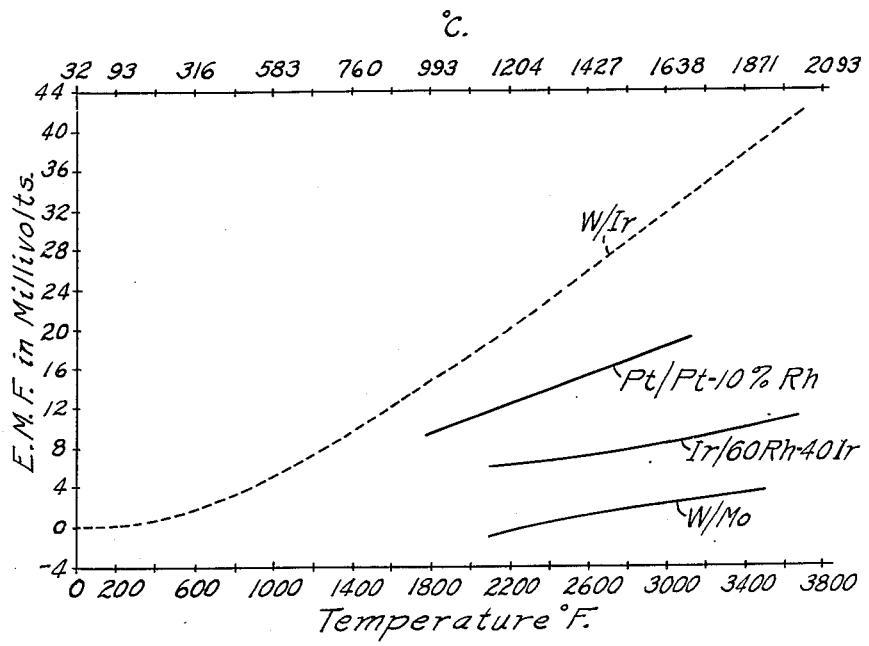

For a better understanding of the nature and objects of the invention, reference should be had to the following detailed description and drawing, in which:

Figure 1 is a plan view of a thermocouple constructed in accordance with the invention, and Fig. 2 is a graph plotting electromotive force in millivolts against temperature for the thermocouple of this invention and other representative couples.

We have discovered that a thermocouple, of which one element is substantially pure tungsten and the other element is substantially pure iridium, is not only suitable for use at the highest temperatures explorable with any known thermocouple but possesses certain other unexpected and highly advantageous characteristics. The thermocouple may be prepared from wire strips or other shapes or forms of tungsten and iridium. Owing to the relatively high cost of iridium ordinarily a fine iridium wire is associated with a fine tungsten wire in producing the thermocouple. It is desirable that the thermocouple be prepared from substantially pure tungsten and iridium at least 99% pure, and preferably having less than 0.1% by weight of impurities.

Referring to Fig. 1 of the drawing, there is illustrated one form of thermocouple that has been prepared in accordance with the invention. The thermocouple comprises a wire 10 of tungsten and another wire 12 of iridium joined together at one point or terminal 14 forming the hot junction of the thermocouple. As shown, the ends of the wires 10 and 12 are twisted together at the terminal 14, though this is not necessary, since twisting is employed mainly to insure a strong hot junction. The extreme ends of the terminal 14 are preferably welded together to form a welded joint 16. We have found it satisfactory to connect the wires 10 and 12 to one line of a 110 volt alternating-current circuit and connect a carbon electrode to the other line of the 110 volt circuit and bring the carbon electrode into contact with the terminal 14. A current of three amperes was found sufficient to produce a good weld on thermocouple wire of a diameter of 0.02". A small amount of borax or the like may be applied to the portion to be welded. The borax has been found not to impair the thermocouple characteristics. The welded joint 16 so produced insures a good electrical contact between the elements of the thermocouple.

The thermocouple wires 10 and 12 are insulated from each other at all other points other than terminal 14, as is well known. Sleeves 22 and 24 of refractory material may be applied to the thermocouple wire to insure that the wires are insulated from each other. As is well known, numerous ceramic materials may be employed for this purpose, for example, alumina, zirconia, magnesia and the like. It will be understood that the ceramic sleeves may be composed of individual short beads or a single member having two longitudinal bores in which to accommodate the wires of the thermocouple. In some instances there need be no insulation as such applied to each of the wires 10 and 12, since they may be physically separated sufficiently in use.

In some instances it may be desirable to measure the electromotive force developed by the thermocouple when only the junction 14—16 is heated in contact with the medium whose temperature is to be measured and the other extremity of each wire is at room or ambient temperature, by connecting the cold ends of wires 10 and 12 to a potentiometer or other measuring device for measuring low voltages of the order of millivolts. However, it may not be necessary to make the entire length of the wire between the hot junction and the measuring instrument entirely of tungsten and iridium. At some point 26 sufficiently removed from the hot junction 16 that the temperature at 26 is at ambient or room temperature, there may be connected two wires 18 and 20 of a less expensive metal than the tungsten and iridium. The wires 18 and 20 ordinarily will be of the same metal, for example, copper or constantan or the like.

We have found that the tungsten-iridium thermocouple of this invention develops the highest known electromotive forces at elevated temperatures of any known metal thermocouple combination used at high temperatures. Referring to Fig. 2 of the drawing, there is illustrated a graph of the electromotive force of the tungsten-iridium thermocouple (the cold junction being at 25° C.) over a range of temperature of up to 2100° C. compared with similar curves of three representative high-temperature thermocouples widely used today. It will be noted that the best of these, a thermocouple composed of platinum and an alloy of platinum with 10% rhodium, exhibits a substantially smaller electromotive force. Also the slope of the electromotive force-temperature curve of the tungsten-iridium couple is much steeper than that of the other couples. A thermocouple composed of iridium for one element and an alloy composed of 60% rhodium and 40% iridium for the other element, has a very flat electromotive force-temperature curve. Likewise, a thermocouple composed of tungsten for one element and molybdenum for the other element not only has a relatively flat electromotive force temperature curve, but the electromotive force is numerically low at all temperatures. A steep electromotive force temperature curve is desirable in that small differences of temperature produce proportionately greater differences in electromotive force with steeper curves. This enables the reading of temperatures to be accomplished with greater accuracy.

Another feature of the tungsten-iridium thermocouple of the present invention is its negligible electromotive force at temperatures of up to better than 100° F. As will be noted, the electromotive force is substantially zero over a wide range of temperature in the region corresponding to room or ambient temperatures. This is advantageous in that there is no requirement for a cold junction compensation as is required with practically every other known thermocouple. As will be obvious to those skilled in the art of temperature measurment errors due to cold junction compensation may be substantial and they always involve an additional step in the process of measuring temperatures which is completely avoided by the thermocouple of the present invention. We have found that cold junction compensation can be eliminated from the thermocouple of our invention without introducing an error of more than 0.1% for hot junction temperatures of above 1000° C.

It will be further noted that the electromotive force curve for the tungsten-iridium thermocouple is almost linear between the temperatures of 1000° C. and 2100° C. (1830° F. to 3810° F.). This renders it extremely convenient in measuring temperatures directly on a potentiometer which may be calibrated quite readily in degrees centigrade or degrees Fahrenheit as described. It should be noted by contrast that the tungsten-molybdenum thermocouple reverses the polarity of the electromotive force in this range and this introduces difficulties entirely avoided by the thermocouple of our invention.

We have further found that the thermocouple of our invention is extremely stable at elevated temperatures. Thermocouples constructed in accordance with the present invention have been employed at temperatures of up to 2000° C. for 120 hours in a helium atmosphere without any substantial variation in the accuracy of the electromotive force. The use of pure metals eliminates one of the factors involved with alloy thermocouples, inasmuch as in an alloy one of the elements is bound to evaporate at a slightly greater rate than the other and the composition of the alloy accordingly changes with use at elevated temperatures, and this leads to a change in the electromotive force developed by the thermocouple.

From our work we have found that the following equation represents the electromotive force in millivolts developed by the thermocouples in the temperature range of 1000° C. to 2100° C.

$$\text{E. M. F. (millivolts)} = -6.98 + 0.0195T + 1.71 \times 10^{-6}T^2$$

where T represents the temperature in degrees centigrade.

Since certain changes may be made in the invention and different embodiments thereof can be prepared without departing from the scope of the invention, it is intended that all matter contained in the above description or shown in the accompanying drawing shall be interpreted as illustrative and not in a limiting sense.

We claim as our invention:

1. A thermocouple comprising an element of substantially pure tungsten and an element of substantially pure iridium joined together at one point.

2. A thermocouple composed of a wire of substantially pure tungsten and a wire of substantially pure iridium welded together at one point forming a hot junction.

3. A thermocouple element composed of a wire of substantially pure tungsten, a wire of substantially pure iridium, the wires being joined together at only one point by welding to form a hot junction, and a ceramic insulator applied to at least the portion of the wires near the hot junction to electrically insulate them from each other at all points other than the welded hot junction.

WALTER C. TROY.
GARY STEVEN.

REFERENCES CITED

The following references are of record in the file of this patent:

UNITED STATES PATENTS

| Number | Name | Date |
|---|---|---|
| 1,584,882 | Marsh et al. | May 18, 1926 |

OTHER REFERENCES

Caswell, International Critical Tables (1929), vol. 6, pp. 213–215.

Brown Inst. Co. Cat. #1102 (1937), p. 42, Fig. 65.

Reference Data for Radio Engineers (1943) p. 25.